Nov. 17, 1970 — H. JAHNKE — 3,541,390

STEADY-FIELD GENERATING ARRANGEMENT

Filed April 29, 1968

Inventor:
Herbert Jahnke
By Michael S. Striker
Attorney

United States Patent Office 3,541,390
Patented Nov. 17, 1970

3,541,390
STEADY-FIELD GENERATING ARRANGEMENT
Herbert Jahnke, Unterthingau, Germany, assignor to Constantin Graf von Berckheim, Weinheim an der Bergstrasse, Germany
Filed Apr. 29, 1968, Ser. No. 724,934
Claims priority, application Germany, May 2, 1967, B 92,330
Int. Cl. H02n 1/06
U.S. Cl. 317—4                      12 Claims

ABSTRACT OF THE DISCLOSURE

An arrangement for providing a steady electric field in an enclosed air-containing space bounded by a plurality of wall portions which are connected to ground potential, includes an electrode provided in the space connected with a source of direct current and electrically insulated from the wall portions. The steady electric field developing between the wall portions and the electrode imparts to air ions and aerosols in the air an electric charge. At least one of the wall portions is provided with an exposed face facing the interior of the enclosed space and having a substantially constant electrical conductivity factor of such magnitude as to enable dissipation of the electrical charge of the ions and aerosols on contact of the ions and aerosols with the exposed face.

BACKGROUND OF THE INVENTION

The present invention relates to a steady-field generating arrangement, and more particularly to an arrangement for generating a steady electric field in an enclosed space.

It is known to provide steady fields in enclosed rooms. The purpose of generating such fields is twofold, namely on the one hand to simulate the steady electric field which is normally found in nature, particularly at relatively high altitudes, and which has a beneficial physiological effect on human beings, and also to obtain electrostatic precipitation of aerosols such as floating dust and other particles and thereby a cleaning of the air in the enclosed space.

Known arrangements of this type include constructions wherein an electrode is mounted below the ceiling of the enclosed space insulated from the ceiling and the other walls bounding this space with the electrode beam connected to the positive pole of a source of high-voltage direct current and the walls bounding the enclosed space being connected to ground to which the negative pole of the source of direct current is also connected. Of course, it is also known to provide for a reversed connection to the poles. Furthermore, it is known to connect one pole of the source of direct current to the electrode and the other pole to a counter electrode provided on or in the floor opposite the ceiling and thereby opposite the electrode. Of course, in this case the counter electrode must be either covered by insulating material, such as a carpet or the like, or if it is not exposed, then it must be embedded in insulating material constituting or forming a part of the floor. Also, the floor electrode may be provided in the manner just described and the lateral walls bounding the enclosed space may be connected with the positive pole of the source of direct current.

In all of these constructions it has been found that the desirable positive physiological influences on human beings in such enclosed spaces are obtained only for short periods following the energizing of the arrangement, and that they subsequently disappear or are significantly reduced. Evidently, there is little point in providing such an arrangement unless the beneficial influences can be permanently maintained.

It has furthermore been found that in order to obtain useful electrostatic precipitation of aerosols from the air, it is necessary to connect the arrangement to rather high voltages. This, however, has made it impossible to utilize the thus energized arrangement for establishing of the desired steady field because the field strength obtained on utilization of such high voltages may be harmful for human beings.

It is therefore a general object of the present invention to overcome these disadvantages outlined above.

A more specific object of the invention is to provide an arrangement of the type here under discussion, which is capable of providing a continuing physiological advantageous influence on persons exposed to the action of the arrangement. Furthermore, it is an object of the invention to provide for the electrostatic precipitation of aerosols from the air in enclosed spaces provided with the arrangement of the invention, but precipiattion under circumstances where the required voltages are sufficiently low so as to obtain field strengths which are not harmful to human beings.

SUMMARY OF THE INVENTION

In accordance with one feature of my invention I provide, in an arrangement for obtaining a steady electric field in an enclosed air-containing space which is bounded by a plurality of wall portions connected to ground potential, and an electrode provided in this space connected with a source of direct current and electrically insulated from the wall portions so that ions and aerosols exposed in the space to the field receive an electric charge, at least one of the aforementioned wall portions with an exposed face facing the interior of the enclosed space and having a substantially constant electrical conductivity factor of such magnitude as to enable dissipation on contact of the electrical charge of such ions and aerosols as move into engagement with the exposed face. Thereby I prevent the formation, adjacent the exposed face, of a blocking layer of charged ions and aerosols due to inadequate dissipation of their respective charges.

My invention is based on the realization that the effects obtained with the type of arrangement here under discussion depend not merely on the positioning of the electrodes and on the voltage supplied by the energy source to which they are connected, but also upon the charge carriers exposed to the steady field. The term charge carriers is intended to designate not only the charged ions but also aerosols of any type which are to be found in the air of an enclosed space provided with the arrangement in question. Assuming, for example, that positively the charged ions move to the negatively charged wall portions bounding the enclosed space without being able to dissipate their positive charge to these negatively charged wall portions, then the positively charged ions will accumulate adjacent the negatively charged wall portions and will form a positively charged blocking layer which will either weaken the steady field or completely negate it. If, on the other hand, the conductivity at the face of the wall portions is such that the charge of all ions and aerosols contacting the face is immediately dissipated without possibility of back-up of the charged ions and aerosols into a blocking layer, then the steady electric field will retain its desired field strength over any desired period of time. In other words, the decrease in field strength or even complete disappearance of the field, and thereby of the desired advantageous physiological effects on human beings exposed to the field, which was observed in the aforementioned prior-art constructions is eliminated. If fresh ions are constantly produced, that is by charging at the positive electrode, there will be a constant flow of ions at minimal charge in the electric field and it will be understood that the desired advantageous physiological influences on persons exposed to the steady field will be provided during the entire period of energization of the arrangement.

Furthermore it will be understood that the immediate dissipation of the charge carried by aerosols, that is the contaminants such as dust or the like, on contact thereof with the exposed face will mean unhindered movement of the charged particles to the wall portions and precipitation thereon without adverse effect on the passage of additional aerosols to similar contact with the wall portions. For this reason the invention provides for adequate precipitation of aerosols at relatively low field strength, contrary to what is known in this field.

I have found it to be advantageous if the electrical conductivity factor at the exposed face is higher than that of the air in the enclosed space by at least one decimal power. This assures positively that all charges of ions and aerosols contacting the exposed face will be immediately dissipated by contrast, for example, to the customary floor and wall coverings of plastic, or the synthetic-plastic sealed floors, all of which have a high insulation resistance and which may change the esthetic charge strongly and uncontrollably and thereby influence the situation in the enclosed space electrically in undesirable manner.

Of course, it is important that the desired high conductivity factor be maintained under all operating circumstances. This is of importance particularly where hydroscopic materials are involved, that is materials which have a limited conductive surface in the presence of moisture but which lose this conductivity and become insulators when the moisture disappears or drops below a certain level. It is therefore advisable to use such materials to provide the aforementioned exposed face, whose electrical conductivity is at least substantially constant and substantially uneffected by changes in operating conditions. The exposed surface may be provided either on the wall portions themselves or by covering the wall portions in suitable manner. This includes coatings of paint or other materials having the desired conductivity for which purpose metallic or salt admixtures may be provided in these coatings, or foils, wall papers, wall hangings, floor coverings or the like which have the requisite conductivity factor. These may be provided with metallic imbedments or the like. It is advantageous if the coatings or coverings are of sufficient porosity so as not to interfere with the natural "breathing" of the wall portions or other backing materials on which they are provided as covers.

If the arrangement utilizes a ceiling electrode which is mounted resulted from the remainder of the arrangement, then it is advantageous if at least the floor wall portion is provided with an exposed face having the requisite conductivity factor. Heretofore, there has been a tendency to insulate persons using rooms or other enclosed spaces provided with these arrangements from such floor electrodes by covering the floor electrode with an insulating layer. According to the present invention, however, it is intended that persons come into contact with the exposed conductive surface because in this manner charges of ions and aerosols which have been discharged to the person may be rapidly dissipated to the exposed face. This avoids a charging of the persons which would prevent the desired advantageous physiological effect. Particularly, this makes it possible to constantly supply the persons in such enclosed spaces with hydrogen ions which are particularly valuable for the purposes at hand.

I have found that it is advantageous to connect the electrically conductive exposed face to mass via a limiting resistor which assures that no unacceptably high current may flow under any circumstances, for instance if the ceiling electrode is touched by a person standing on a conductive exposed face or simultaneously touching such a conductive exposed face. If the invention is utilized in a vehicle, for instance the passenger compartment of a motor vehicle, it is advantageous if the seats and if desired also the walls are provided with a cover having the exposed face. Such a cover may be constructed with a conventional removable protective cover, for instance in the case of seats as a conventional seat cover of the type well known for protecting the seats of motor vehicles.

The novel features which are considered as characteristic for the invention are set forth in particular in the appended claims. The invention itself, however, both as its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
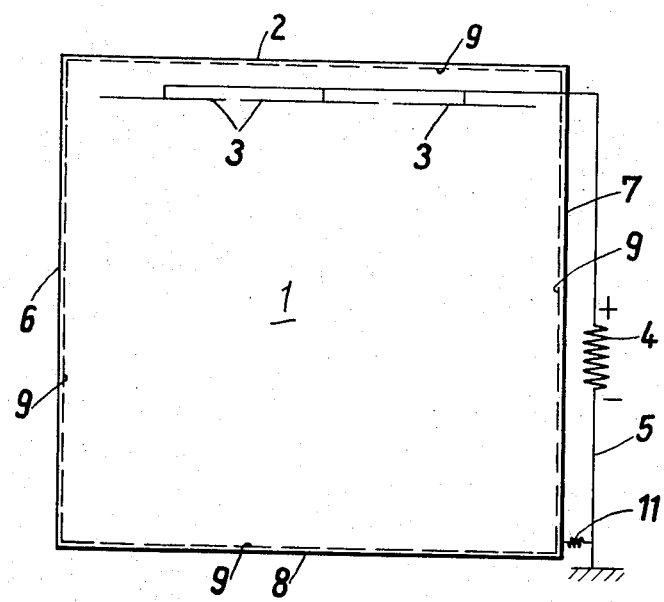
FIG. 1 is a vertical section through a diagrammatically illustrated room provided with an arrangement according to the present invention.

Discussing now the drawing in detail, firstly FIG. 1 thereof, it will be seen that in this figure I have illustrated diagrammatically a room 1 bounded by a ceiling 2, a floor 8 and side walls 6 and 7. Arranged below the ceiling 2 is a ceiling electrode 3, which may consist of one, two or more sections and which is electrically insulated from the ceiling, the side walls and the floor of the room. The electrode 3 is connected in this embodiment with the positive pole of a source 4 of high voltage direct current. The negative pole of the source 4 is connected via the conductor 5 to ground.

Figure 2:
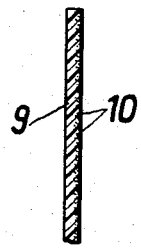
FIG. 2 is a section through a covering provided with the conductive exposed face by inclusion of conductivity-enhancing particles.

The ceiling 2, the side walls 6 and 7 and the floor 8 are all connected to ground also and constitutes counter electrodes to the ceiling electrode 3. In view of the fact that it must be assumed that the conductivity of the ceiling, the floor and the side walls will change in uncontrollable manner depending upon the humidity present in the ambient atmosphere, or will even decrease to zero, charge carriers such as aerosols and ions present in the air of the room 1 and in the illustrated embodiment provided with a positive charge, cannot dissipate their charges properly to the ceiling, the floor and the side walls. For this reason, in accordance with the present invention, at least one of these various wall portions is provided with an exposed face having the desired substantially constant electrical conductivity factor which is to be of such magnitude as to enable dissipation on contact of the electrical charges of ions and aerosols. In the illustrated embodiment all wall portions, that is the ceiling 2, the floor 8 and the side walls 6 and 7, are provided with such an exposed face. FIG. 1 shows that in the illustrated embodiment this exposed face is constituted by a covering 9 which is shown in section in FIG. 2. Before discussing FIG. 2 it should be understood that the covering 9 could also be provided in form of a coating of paint, varnish or the like which has the desired conductivity factor, for instance by having metallic particles or salt admixed therewith.

Returning to FIG. 2, however, it will be seen that in the embodiment of FIG. 1 the covering 9 is assumed to be a layer or foil of synthetic plastic material which is provided at its exposed surface 10 with a coating of metallic particles which impart to it the desired conductivity factor.

Figure 3:
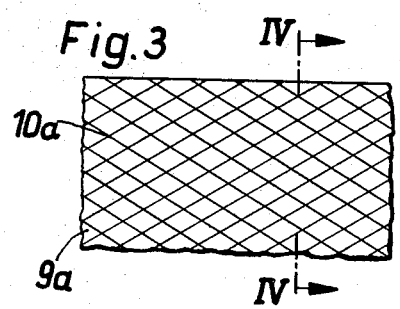
FIG. 3 is a plan view of a covering provided with the exposed conductive face and including at the face a metal imbedment.
Figure 4:
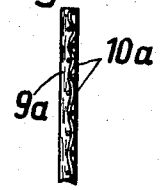
FIG. 4 is a section taken on the line IV–IV of FIG. 3.

FIGS. 3 and 4 show that such a covering, which is identified in these figures with reference numeral 9a, may instead by provided with a surface layer 10a consisting of a mesh or fabric of metallic material, such as wires or the like. In this case it will be understood, of course, that it is essential that this layer 10a be exposed at the exposed face, that is it must not be embedded in the material of the cover 9a in such a manner that it is covered with the material of the cover 9a at that side which is to face the interior of the room 1. Evidently, other ways for providing the desired electrically conductive exposed face are possible.

Regardless of how this exposed face of substantially constant electrical conductivity is provided, however, FIG. 1 shows it to be connected to ground, here the intermediary of the conductor 5, through a limiting resistor 11 which is provided for the purposes discussed above.

Figure 5:
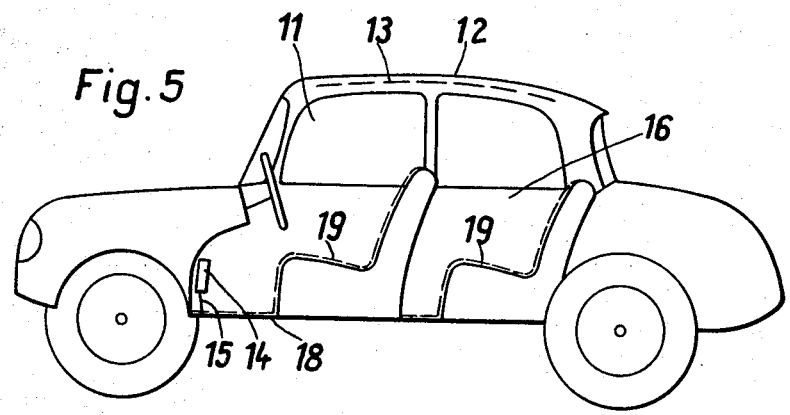
FIG. 5 is a diagrammatic vertical longitudinal section through a motor vehicle provided with the arrangement according to the present invention.

While FIG. 1 shows utilization of the inventive arrangement in a stationary room, FIG. 5 shows that the arrangement may be similarly utilized in vehicles, here assumed to be a motor vehicle for purely explanatory reasons. The arrangement is of particular advantage in the type of vehicle having a closed metal body, or at least a closed passenger compartment which shields the passengers from the natural field. In the embodiment of FIG. 5 the interior of the passenger compartment is identified with reference numeral 11, the ceiling of the passenger compartment with reference numeral 12, the floor with reference numeral 18 and one of these side walls with reference numeral 16. One or more ceiling electrodes 13 are mounted below the ceiling 12 electrically insulated from the same and all the other walls bounding the passenger compartment 11 and this ceiling electrode 13 is connected in known manner which need not be further described with the positive pole of a source 14 of high voltage direct current. The negative pole of the source 14 is connected with mass, that is for instance with the floor 18 of the vehicle via the conductor 15.

In many instances vehicles of this or other types are provided on the floors with rubber mats and on their seats with synthetic plastic covers, all of which acts as insulators. Frequently these insulating materials receive a rather high electrostatic charge in a completely uncontrollable manner because of the movement of passengers resulting from vibrations of the vehicle. This may in some cases even result in the developemnt of a steady electric field having a different polarity than what is desired. In any case, however, the mere provision of a ceiling electrode and a counter electrode arranged below the insulating floor mats will not suffice to obtain the desired beneficial results. In accordance with the present invention I therefore provide a covering 19 on the floor 18 of the vehicle, or on a suitable floor covering which itself overlies the floor 18, and I advantageously provide this covering 19 also on the seats of the vehicle, including the back rests and even on arm rests and the side walls of the vehicle. This covering 19 has the same substantially constant electrical conductivity factor discussed above with respect to covering 9 of FIG. 1. The results obtained are also the same as those discussed with respect to the arrangement shown in FIG. 1. It is advantageous if this covering 19 also is connected to ground, or rather to mass, via a limiting resistor corresponding to the one identified with reference numeral 11 in FIG. 1. Of course it will be appreciated that the covering 1 may be constituted by or provided on the conventional removable seats covers which are well known for the purpose of protecting seats of vehicles against damage and dirt. For instance, metallic wires may be woven into these seat covers or the desired conductivity may be imparted in other well-known ways.

It is also advantageous, regardless of whether the arrangement is used in stationary applications or in moving vehicles, to provide for movement of the air within the thus protected enclosed space, for instance by means of a fan, blower or the like. This enhances the possibility for the aerosols, that is dust particles and other contaminants, to move towards and into engagement with the respective exposed faces without formation of a blocking layer.

By resorting to my invention the voltage used to energize the arrangement may be so selected that a field strength is obtained between the ceiling electrode 3 and the counter electrodes, that is in FIG. 1 for instance the exposed faces provided on the floor portions 2, 6 and 7 that a very effective aerosol precipitation is effected, while the field strength between the ceiling electrode 3 and the floor portion 8 is considerably weaker and of such magnitude as not to be objectionable or dangerous to persons exposed to it even for prolonged period of time. The capacitant's errants which result from movement of persons in an enclosed space provided with such an arrangement are only insignificant and do not have any deleterious effects.

It will be understood that each of the elements described above, or two or more together, may also find a useful application in other types of constructions differing from the types described above.

While the invention has been illustrated and described as embodied in a steady-field generating arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an arrangement for providing a steady electric field in an enclosed air-containing space bounded by a plurality of wall portions connected to ground potential, and including an electrode provided in said space connected with a source of direct current and electrically insulated from said wall portions so that ions and aerosols exposed in said space to said field receive an electric charge and move to said wall portions or electrode, respectively, the improvement wherein at least one of said wall portions is provided with an exposed face facing the interior of said enclosed space and having a substantially constant electrical conductivity factor greater than that of the air in said space by at least one decimal power so as to enable dissipation on contact of the electrical charge of such ions and aerosols as move into engagement with said exposed face, whereby to prevent the formation adjacent said exposed face of a blocking layer of charged ions and aerosols due to inadequate dissipation of their respective charges.

2. In an arrangement as defined in claim 1, said enclosed space having a ceiling and a floor each constituted by a wall portion, said electrode being arranged adjacent said ceiling and said one wall portion provided with said exposed face being said floor.

3. In an arrangement as defined in claim 1, wherein said one wall portion comprises a conductive covering provided thereon and having said exposed face.

4. In an arrangement as defined in claim 1, wherein said one wall portion comprises a conductive coating provided thereon and having said exposed face.

5. In an arrangement as defined in claim 3, wherein said covering comprises a metallic embodiment importing to said exposed face said conductivity factor.

6. In an arrangement as defined in claim 4, wherein said coating consists of conductive paint.

7. In an arrangement as defined in claim 1, wherein said exposed face comprises an exposed surface layer and at least one backing layer, and further comprising metallic material admixed with the material of at least said surface layer.

8. In an arrangement as defined in claim 1, wherein said exposed face comprises an exposed surface layer and at least one backing layer, and further comprising a conductivity enhancing salt admixed with the material of at least said surface layer.

9. In an arrangement as defined in claim 3, said covering being porous.

10. In an arrangement as defined in claim 1, and further comprising a limiting resistor connected with said exposed face and with ground.

11. In an arrangement as defined in claim 1, wherein said wall portions together surround the passenger compartment of a vehicle; further comprising at least one seat provided within said passenger compartment and having an exposed seat face having a conductivity factor similar to that of said exposed face and also being connected to ground.

12. In an arrangement as defined in claim 11, said seat including a removable seat cover adapted to cover at least portions of said seat and being provided with said exposed seat surface.

References Cited

UNITED STATES PATENTS

| | | | |
|---|---|---|---|
| 2,190,712 | 2/1940 | Hansen | 128—422 X |
| 3,311,108 | 3/1967 | Cristofv et al. | 317—4 X |
| 3,378,726 | 4/1968 | Lankow | 317—2 |
| 3,386,001 | 5/1968 | Slosberg et al. | 317—2 |
| 3,371,247 | 2/1968 | Mullenger | 317—2 |
| 2,457,299 | 12/1948 | Biemesderfer | 317—2 |
| 3,121,825 | 2/1964 | Abegg et al. | 317—2 |
| 2,372,829 | 4/1945 | Holst | 317—2 |
| 3,483,672 | 12/1969 | Jahnke | 317—4 X |

J. D. MILLER, Primary Examiner

W. J. SMITH, Assistant Examiner

U.S. Cl. X.R.

317—2, 262